United States Patent [19]
Johnson, Jr.

[11] 3,783,303
[45] Jan. 1, 1974

[54] ANTI-THEFT DEVICE FOR MOTOR VEHICLE

[75] Inventor: John L. Johnson, Jr., Dallas, Tex.

[73] Assignee: The Raymond Lee Organization, Inc., New York, N.Y.

[22] Filed: June 14, 1972

[21] Appl. No.: 262,776

[52] U.S. Cl. ............... 307/10 AT, 180/114, 340/64
[51] Int. Cl. ............................................ B62d 45/00
[58] Field of Search ................ 307/10 AT; 180/114; 340/63, 64

[56] References Cited
UNITED STATES PATENTS

| 3,614,460 | 10/1971 | Hale | 307/10 AT |
| 3,639,772 | 2/1972 | Wilson | 307/10 AT |
| 3,158,749 | 11/1964 | McAllister | 307/10 |

Primary Examiner—Herman J. Hohauser
Attorney—Daniel Jay Tick

[57] ABSTRACT

A circuit component connected in the ignition system of a motor vehicle selectively opens and closes the circuit of the ignition system thereby controlling the starting of the engine of the vehicle.

1 Claim, 1 Drawing Figure

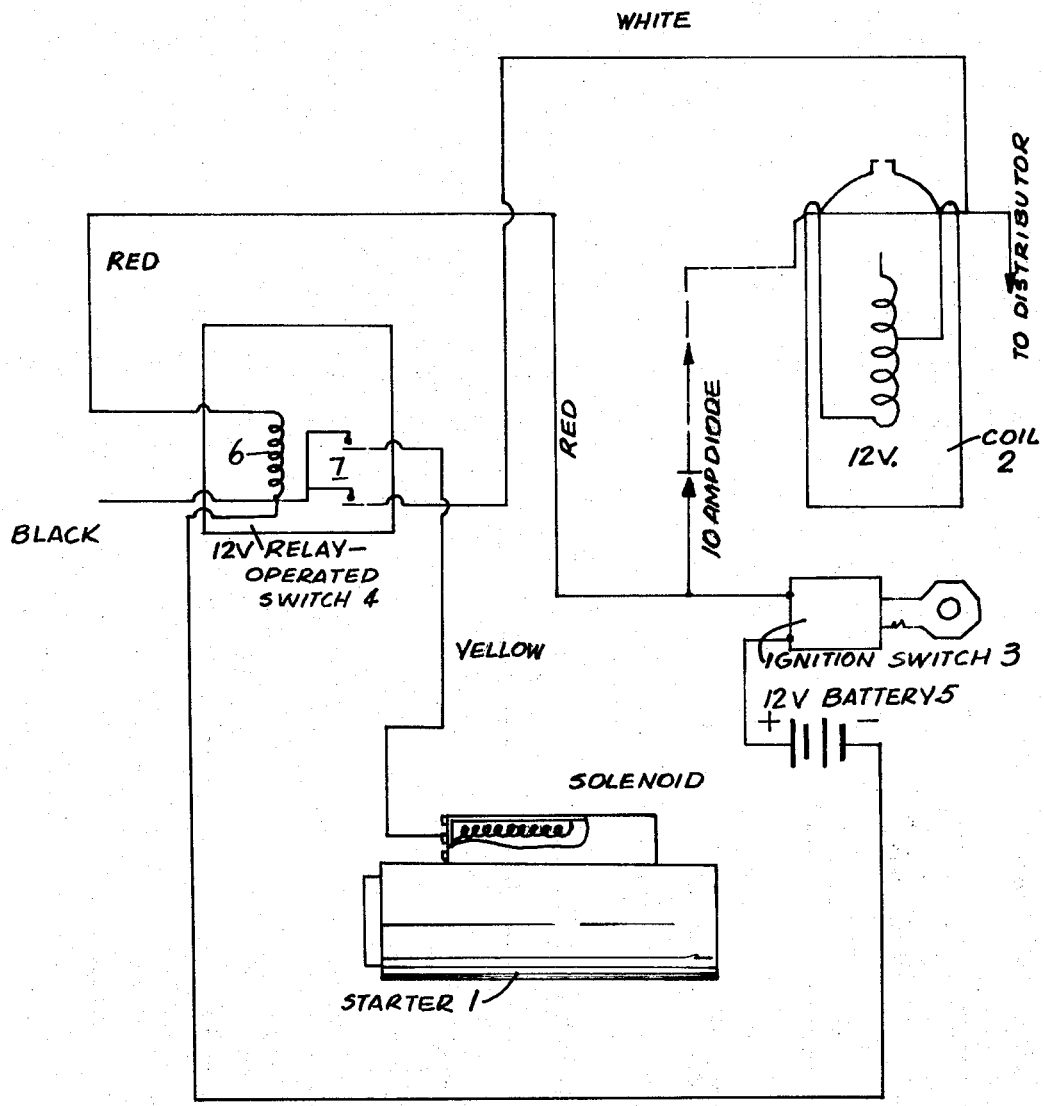

ANTI-THEFT DEVICE FOR MOTOR VEHICLE

DESCRIPTION OF THE INVENTION

The present invention relates to an antitheft device. More particularly, the invention relates to an antitheft device for a motor vehicle.

An object of the invention is to provide an antitheft device for a motor vehicle which device is of simple structure, inexpensive in manufacture and which may be installed in existing ignition systems of motor vehicles with facility and rapidity.

Another object of the invention is to provide an antitheft device for a motor vehicle which device functions with efficiency, effectiveness and reliability.

In order that the invention may be readily carried into effect, it will now be described with reference to the accompanying drawing, wherein the single FIGURE is a circuit diagram of an embodiment of the antitheft device of the invention connected in the ignition system of a motor vehicle.

A motor vehicle has an engine (not shown in the FIGURE) and an ignition system for the engine. The ignition system comprises a starter 1, a coil 2 and a distributor (not shown in the FIGURE) connected to the distributor. The ignition system further comprises an ignition switch 3.

The antitheft device of the invention comprises a circuit arrangement connected in the ignition system of the vehicle. The circuit arrangement selectively closes and opens the circuit of the ignition system thereby controlling the starting of the engine of the veeicle. The circuit arrangement comprises a relay-operated switch 4 connected between the starter 1 and the coil 2 for selectively closing and opening the circuit of the ignition system.

The relay-operated switch 4 is controlled in operation by the ignition switch 3. The ignition system further comprises a source of voltage, which is the usual vehicular battery 5 producing 12 volts. The relay-operated switch 4 comprises a relay winding 6 connected to the battery 5 via the ignition switch 3 and contacts 7. The contacts 7 are controlled in operation by the relay winding 6. The contacts 7 are connected in circuit between the starter 1 and the coil 2.

In operation, when the ignition switch 3 is closed by the driver, the relay winding 6 of the relay-operated switch 4 of the present invention is energized by the battery 5. When the relay winding 6 is energized, it closes the contacts 7 thereby closing the ignition circuit from the starter 1 to the coil 2. This enables the engine to start.

If a thief attempts to short-circuit various parts of the circuit of the ignition system, he will be unable to start the engine, since only the closing of the contacts 7 will enable the engine to start.

While the invention has been described by means of specific examples and in specific embodiments, I do not wish to be limited thereto, for obvious modifications will occur to those skilled in the art without departing from the spirit and scope of the invention.

I claim:

1. An antitheft device for a motor vehicle having an engine and an ignition system comprising a starter, a coil, a distributor connected to the coil, an ignition switch and a source of voltage, the antitheft device comprising relay-operated switch means connected in the ignition system between the starter and the coil for selectively closing and opening the circuit of the ignition system thereby controlling the starting of the engine of the vehicle, the relay-operated switch means comprising a relay winding connected to the source of voltage via the ignition switch and contact means controlled in operation by the relay winding and connected in circuit between the starter and the coil of the ignition system.

* * * * *